United States Patent [19]

Jinno et al.

[11] Patent Number: 4,886,717

[45] Date of Patent: Dec. 12, 1989

[54] PHOTOCHROMIC MATERIAL, PHOTOCHROMIC DEVICE AND METHOD FOR RECORDING AND ERASING INFORMATION

[76] Inventors: Masafumi Jinno, 405, Nakayama Kopo, 238, Kokubu, Ebina-shi, Kanagawa 243; Ichiro Kake, 5-409, Shimonoike Dai-2-Danchi, 545, Nagasone-cho, Sakai-shi, Osaka 591; Yuichiro Nishina, 3-8-9, Komegafukuro, Sendai-shi, Miyagi 980; Tsuyoshi Masumoto, 3-8-22, Kamisugi, Sendai-shi, Miyagi 980, all of Japan

[21] Appl. No.: 69,440

[22] PCT Filed: Nov. 6, 1986

[86] PCT No.: PCT/JP86/00563

§ 371 Date: Sep. 8, 1987

§ 102(e) Date: Sep. 8, 1987

[87] PCT Pub. No.: WO87/03108

PCT Pub. Date: May 21, 1987

[30] Foreign Application Priority Data

Nov. 6, 1985 [JP] Japan .................................. 60-249808

[51] Int. Cl.$^4$ ............................ G03C 1/72; G03C 5/16
[52] U.S. Cl. ...................................... 430/19; 430/338; 430/341; 430/346; 430/495; 430/962
[58] Field of Search ................. 430/19, 338, 495, 341, 430/962, 346

[56] References Cited

U.S. PATENT DOCUMENTS 3,334,229 8/1967 Makino ............................... 430/962
3,671,250 6/1972 Andrews et al. ................... 430/495
3,879,201 4/1975 Williams et al. .................... 430/19
3,888,668 6/1975 Keller .................................. 430/495
4,218,504 8/1980 Yamato et al. ..................... 430/338
4,503,177 3/1985 Reid et al. ........................... 524/89

Primary Examiner—Paul R. Michl
Assistant Examiner—Mark R. Buscher
Attorney, Agent, or Firm—Armstrong, Nikaido, Marmelstein, Kubovcik & Murray

[57] ABSTRACT

A photochromic material comprising a thin film of montmorillonite intercalation compound which has as a guest organic metal complex ions exhibiting a property of accepting electrons in a photo-excited state, a photochromic device comprising; (i) a transparent electrode layer 1, (ii) a transparent layer 2 of polycrystalline n-type semiconductor, (iii) the above-mentioned thin film 3 of montmorillonite intercalation compound, (iv) an electrolytic layer 6 containing an electron-donative reducing agent and (v) an opposed transparent electrode layer 4, and a method for recording and erasing information, comprising the steps of forming the above-mentioned thin film 3 of montmorillonite intercalation compound over the transparent layer 2 of polycrystalline n-type semiconductor, irradiating with light the thin film 3 in contact with the electrolyte 6 containing an electron-donative reducing agent to develop color on the irradiated site of the film and applying a bias voltage to the film being exposed to light to remove the color of the site due to the photosensitizing electrolyte action, whereby an optical memory material which withstands long-term use and repeated use can be obtained.

6 Claims, 4 Drawing Sheets

PHOTOCHROMIC MATERIAL, PHOTOCHROMIC DEVICE AND METHOD FOR RECORDING AND ERASING INFORMATION

TECHNICAL FIELD

The present invention relates to a photochromic material capable of reversibly controlling the recording and erasing of information in the form of letters, figures or the like by light irradiation, a photochromic device utilizing the same, and a method for recording and erasing information.

BACKGROUND ART

Among typical examples of known photochromic materials is silver halogenide. Silver halogenide heretofore used, e.g., for producing photochromic lenses in sunglasses discolors due to thermal vibration at ambient temperature on discontinuation of light irradiation, thus lacking a long-term stability in principle.

Also attempts have been made to use viologens as photochromic materials. In this case, the color development of univalent cation radical produced by reduction is utilized. However, with the progress of dimerization by the high reactivity of the color former itself, discoloration proceeds within hours while consuming viologen. Accordingly viologen also finds no use, in principle, as a material able to withstand a longterm use or repeated use.

DISCLOSURE OF THE INVENTION

In view of the state of the art as described above, the present inventors conducted various lines of research and found the following. Tris(2,2'-bipyridyl)rhodium (III) complex ions (hereinafter referred to as "$Rh(bpy)_3^{3+}$") or like organic metal complex ions intercalated between the montmorillonite layers when in a photo-excited state accepts electrons from the reducing agent, causing the resulting reductant to stably continue the color development after stoppage of light irradiation. Subsequently the oxidation of the reductant by proper means recovers the original state of $Rh(bpy)_3^{3+}$ or the like to achieve decoloration.

The present invention provides the following photochromic material, photochromic device and method for recording and erasing information using the photochromic material or device.

(1) A photochromic material comprising a thin film of montmorillonite intercalation compound which has as a guest organic metal complex ions exhibiting a property of accepting electrons in a photo-excited state.

(2) A photochromic device comprising;
 (i) a transparent electrode layer,
 (ii) a transparent layer of polycrystalline n-type semiconductor,
 (iii) a thin film of montmorillonite intercalation compound which has as a guest organic metal complex ions exhibiting an electron-accepting property in a photo-excited state,
 (iv) an electrolyte layer containing an electron-donative reducing agent, and
 (v) an opposed transparent electrode layer.

(3) A method for recording and erasing information, comprising the steps of forming a thin film of montmorillonite intercalation compound containing as a guest organic metal complex ions having an electronaccepting property in a photo-excited state over a transparent layer of polycrystalline n-type semiconductor, irradiating with light the thin film in contact with an electrolyte containing an electron-donative reducing agent to develop color on the irradiated site of the film and applying a bias voltage to the film being exposed to light to remove the color of the site due to the photosensitizing electrolytic action.

Examples of organic metal complex ions exhibiting an electron-accepting property in a photo-excited state include six-coordinate octahedral rhodium (III) complex ions having bidentate ligands, more specific examples being $Rh(phen)_3^{3+}$ having 1,10-phenanthrolines as ligands as well as said $Rh(bpy)_3^{3+}$.

$Rh(bpy)_3^{3+}$ or like rhodium (III) complex ions to be used in the present invention have the advantages of (a) being brought into active photo-excited state, (b) giving a reductant which is stable and free of consumption by side reaction, (c) being able to regain the original state on oxidation, (d) being able to form a significantly stable intercalation compound in combination with montmorillonite due to intercalation by ion exchange with the result that the $Rh(bpy)_3^{3+}$ or like rhodium (III) complex ions are unlikely to be released even in water, and (e) producing a reductant which alone has a light-absorbing band at the visible zone. Therefore, the complex ions to be used in the present invention can be said to have properties suitable for producing an optical-memory material which requires reversibility.

BEST MODE FOR PRACTICING THE INVENTION

Figure 1:
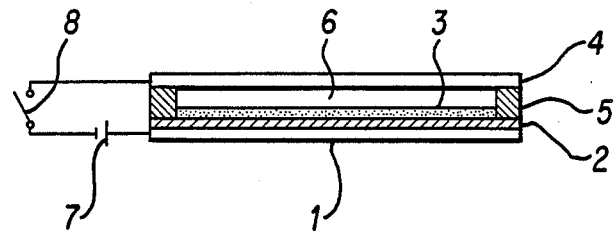
FIG. 1 is a schematic view showing in section an example of the photochromic device according to the present invention.

Referring to the drawings, we will describe below the photochromic material of the present invention, photochromic device using the same, and method for recording and erasing information by light. Organic metal complex ions will be hereinafter represented by $Rh(bpy)_3^{3+}$.

In the photochromic device shown in FIG. 1, a metallic titanium film is formed on a transparent electrode 1 of NESA glass, for example, by vacuum deposition method, sputtering method or the like and is oxidized in air at about 450° C. to produce a transparent layer 2 of polycrystalline titanium dioxide. Processes for forming the titanium dioxide layer 2 are not limited to said process and include other known processes, e.g., reactive sputtering which directly gives an oxide layer. Subsequently an aqueous suspension of montmorillonite is applied to the titanium dioxide layer 2 and dried to provide a montmorillonite layer with which an aqueous solution containing Rh(bpy)$_3^{3+}$ or like rhodium (III) complex ions is then brought into contact to cause the intercalation of Rh(bpy)$_3^{3+}$ or like rhodium (III) complex ions by exchange with montmorillonite interlayer ions, affording an intercalation compound layer 3. The montmorillonite layer can be contacted with the complex ions by desired means, e.g., by immersing the montmorillonite layer in the aqueous solution of complex ions, or spraying or applying the aqueous solution of complex ions onto the montmorillonite layer. The intercalation compound layer 3 has a thickness of preferably about 0.5 μm to about 5 μm, more preferably about 1 μm. The layer less than 0.5 μm in thickness tends to result in obscure recording of information, whereas the layer more than 5 μm in thickness makes it difficult to erase the recorded information. Thereafter an opposed transparent electrode 4 is disposed in a way to interpose spacers 5 made of an insulator. A solution of electron-donative reducing agent containing a supporting electrolyte is charged into a hollow space defined by the intercalation compound layer 3, spacers 5 and opposed electrode 4. Triethanolamine is exemplary of the electron-donative reducing agent and KCl, NaCl or the like is illustrative of the supporting electrolyte. Water is an example of a solvent. Triethanolamine is used as the electron-donative reducing agent preferably at a concentration of 50 mole % or less in view of a need to use an approximately equimolar amount of water. A suitable concentration of KCl or like electrolyte is about 2 mole % to about 3 mole %. To the transparent electrodes 1 and 4 are connected a switch 8 and a bias supply 7 for erasing the recorded information.

For recording information with the photochromic device shown in FIG. 1, ultraviolet light rays at a wavelength of 330 nm or less capable of exciting Rh(bpy)$_3^{3+}$ are applied from a position on the side of the transparent electrode 1. This irradiation causes the Rh(bpy)$_3^{3+}$ in the intercalation compound layer 3 to absorb the light energy, getting into an excited state, Rh*(bpy)$_3^{3+}$, which acts as an oxidizer on triethanolamine (TEOA) and transforms into a reductant by acceptance of electrons, as shown below in the scheme (1).

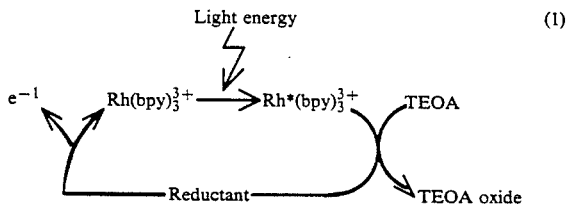

Figure 2:
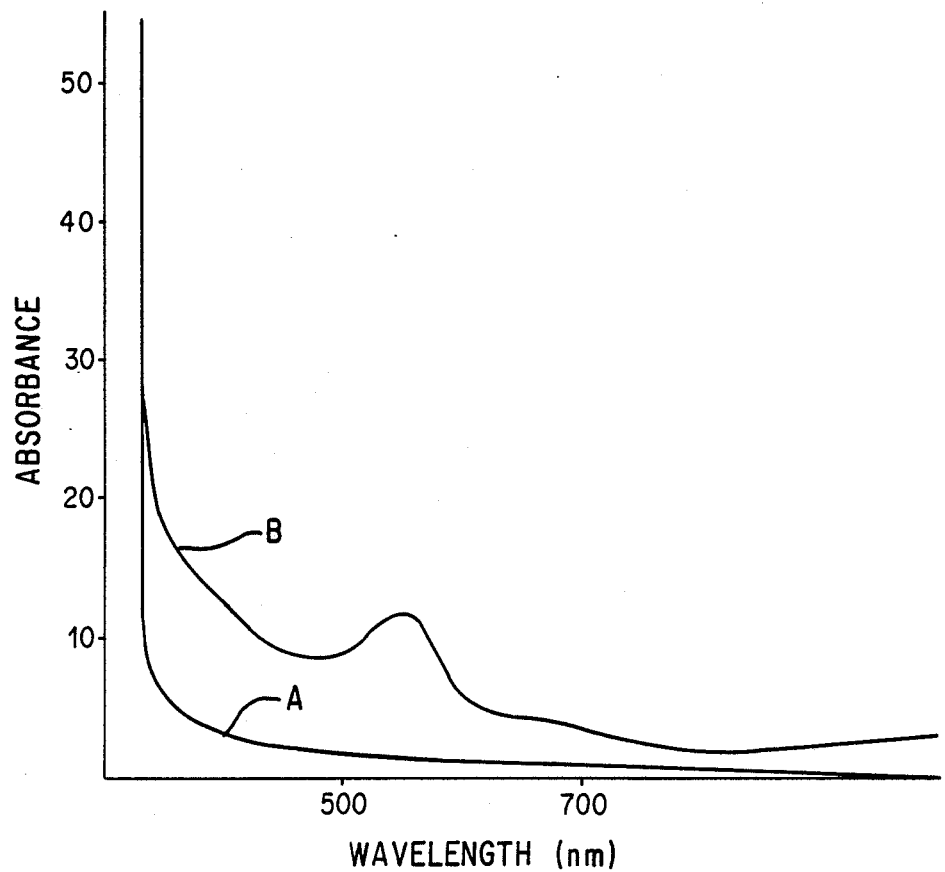
FIG. 2 is a graph showing the absorption spectrum before and after exposing to light the montmorillonite-Rh complex ion intercalation compound to be used in the present invention.

In FIG. 2, a curve A shows the absorption spectrum of the montmorillonite-Rh complex ion intercalation compound before irradiation, and a curve B the absorption spectrum thereof after irradiation. The curve B reveals that the reductant has an absorption band at about 550 nm so that the site exposed to light turns purple. The reductant is stable and remains free of fading phenomenon even after stoppage of irradiation, hence able to stably record information over a prolonged period of time.

Figure 3:
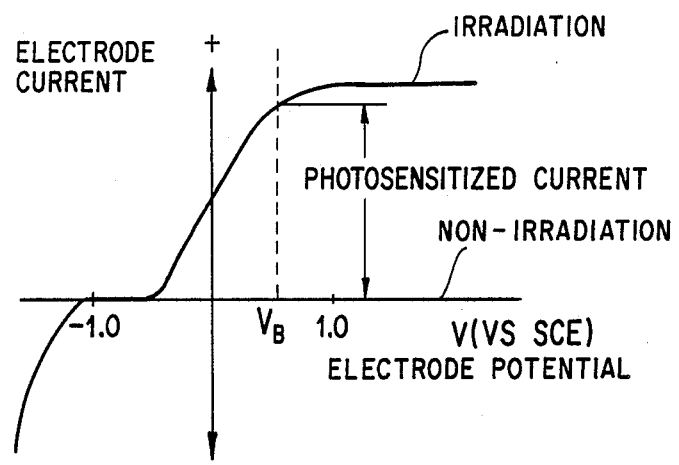
FIG. 3 is a graph showing the photosensitizing electrolytic action of titanium dioxide.

Decoloration or erasure of information will be discussed below. As shown in FIG. 3, titanium dioxide which is an n-type semiconductor is known to have a property of permitting the flow of anode current when exposed to light (<415 nm), i.e. exhibit photosensitizing electrolytic action. Accordingly, when an electrode bias is fixed at $V_B$ point, a photosensitized current flows only during irradiation, whereby oxidation is initiated on the electrode surface. As seen from FIG. 1, the photochromic device of the present invention has the montmorillonite intercalation compound layer superposed on the polycrystalline titanium dioxide layer. Consequently when the switch 8 is turned on to apply a suitable bias voltage, an anode current flows through the Rh complex ion reductant only at the irradiated site thereof which reductant is formed between the layers by the recording or memory procedure, whereby the the site of the reductant becomes oxidized, thereby resulting in return to the Rh(bpy)$_3^{3+}$ as shown above in the scheme (1). In erasure, light beam is properly applied at a wavelength of 340 to 410 nm at which the irradiation can excite the titanium dioxide alone but not Rh(bpy)$_3^{3+}$. In recording, an anode current will not flow by holding open the switch 8 so that a reductant will be produced without hindrance.

Lastly, we will describe below a method for improving the photosensitive wavelength range and the sensitivity. While ultraviolet light having a wavelength of 330 nm or less is required for direct excitation of Rh(bpy)$_3^{3+}$, the conjoint intercalation of Ru(bpy)$_3^{2+}$ complex ions as a photocatalyst into the montmorillonite affords an electron-transmitting route as shown below in the scheme (2) so that Rh(bpy)$_3^{3+}$ is reduced by excited Ru(bpy)$_3^{2+}$.

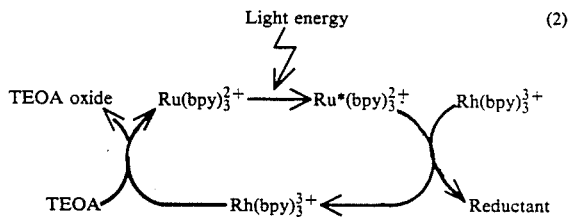

In this case, Ru(bpy)$_3^{2+}$ can be excited by light irradiation at a wavelength of about 450 nm so that a Rh complex ion reductant can be formed efficiently by visible light of lower energy. Ru complex ions which are produced by replacing the ligands of Ru(bpy)$_3^{2+}$ with 1,10-phenanthrolines analogous to bipyridyl can give the same level of photocatalytic effect. This fact shows that similar six-coordinate octahedral ruthenium (II) complex ions having bidentate ligands are also useful as a photocatalyst. To intercalate into the montmorillonite layer the Rh(bpy)$_3^{3+}$ or like organic metal complex ions and Ru(bpy)$_3^{2+}$ or like photocatalyst at the same time, the montmorillonite layer may be contacted with a solution of their mixture.

According to the present invention, there is provided a stable photochromic material which is suitable as an optical recording material required to have reversibility and which can endure a long-term use or repeated use.

REFERENCE EXAMPLE 1

Figure 4:
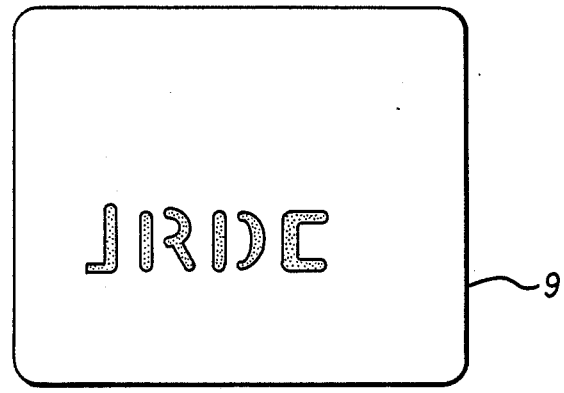
FIG. 4 is a view of the photochromic device which has recorded information.
Figure 5:
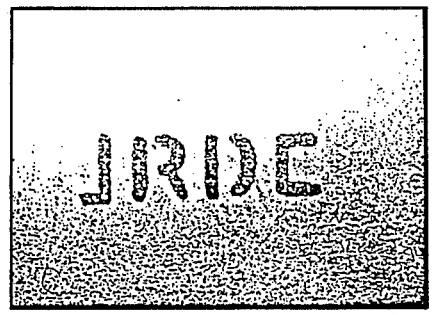
FIG. 5 is a photograph of the photochromic device which has recorded information.

The photochromic device of the present invention was brought into contact with an electrolyte containing an electron-donative reducing agent, and exposed to light in state, whereby letters "JRDC" were written. A view of the photochromic device with the letters thus written is shown in FIG. 4 in which the letters "JRDC" are clearly written in the photochromic device 9. FIG. 5 is a photograph of the photochromic device having the letters written therein.

Figure 6:
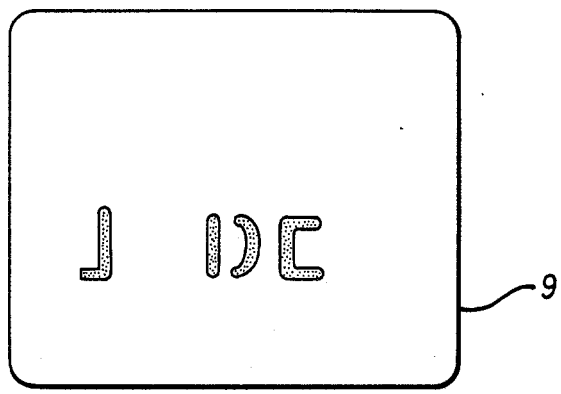
FIG. 6 is a view of the photochromic device which has erased the information.
Figure 7:
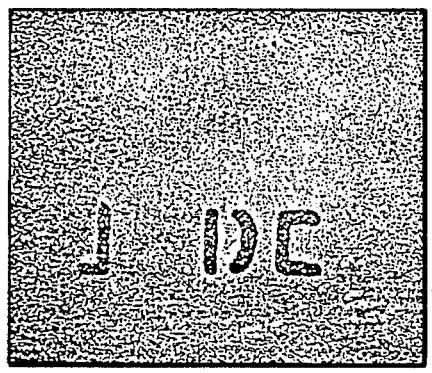
FIG. 7 is a photograph of the photochromic device which has erased the information.

Thereafter, while a bias voltage was applied, the portion of "R" alone was irradiated with light, thereby eliminating the letter "R". FIG. 6 is a view of the photochromic device thus irradiated in which the letter "R" was erased, leaving only the letters "J DC" on the photochromic device 9. FIG. 7 is a photograph of the photochromic device from which the letter "R" was eliminated.

POSSIBILITY OF INDUSTRIAL APPLICATION

According to the present invention, the photochromic material can be put into practical use as an optical-memory material such as optical-memory card, and it is further possible to obtain a material for the manufacture of hydrogen by causing water to decompose utilizing the reducing power resulting from light irradiation.

We claim:

1. A photochromic device comprising:
   (i) a first transparent electrode layer;
   (ii) a transparent layer of polycrystalline n-type semiconductor on the transparent electrode layer;
   (iii) a thin film of montmorillonite having a photochromatically effective amount of tris (2,2'-bipyridyl)rhodium (III) or of tris(1,10-phenanthroline)rhodium (III) ions intercalated therein, on the semiconductor layer;
   (iv) a second transparent electrode layer opposed to the first transparent electrode layer and separated from the film of montmorillonite by means of insulators; said second transparent electrode, said film of montmorillonite, and said insulators forming a hollow space; and
   (v) a solution containing an electrolyte and an electron donor in said hollow space.

2. A photochromic device according to claim 1, wherein the transparent layer of n-type semiconductor is a polycrystalline titanium dioxide layer and the electron donor is triethanolamine.

3. A photochromic device according to claim 1, wherein the thin film of montmorillonite additionally contains a photocatalytically effective amount of tris(2,2'-bipyridyl)ruthenium (II) or tris(1,10-phenanthroline)ruthenium (II) ions.

4. A method for recording information, which comprises exposing the montmorillonite layer in the photochromic device of claim 1 to ultraviolet light having a wavelength of 330 nm or less, thereby causing the rhodium ions intercalated in the montmorillonite layer of the device activated by exposure to said light to accept electrons from the electron donor and form a purple reductant.

5. A method for recording information, which comprises exposing the montmorillonite layer in the photochromic device of claim 3 to light having a wave length about 450 nm, thereby causing the ruthenium ions intercalated in the montmorillonite layer of the device to reduce said rhodium ions and form a purple retardant.

6. A method for erasing the information recorded according to the method of claim 4 or 5, which comprises exposing the purple reductant to light at a wavelength of 340 to 410 nm while passing an anode current through the purple reductant.

* * * * *

UNITED STATES PATENT AND TRADEMARK OFFICE
CERTIFICATE OF CORRECTION

PATENT NO.   :   4,886,717
DATED        :   December 12, 1989
INVENTOR(S)  :   JINNO et al It is certified that error appears in the above-identified patent and that said Letters Patent is hereby corrected as shown below:

On the cover page, after Item [76], insert:

--[73] Assignees: Research Development Corporation of Japan, Tokyo; Tsuyoshi Masumoto, Miyagi; Osaka Cement Co., Ltd., Osaka; and Shimadzu Corporation, Kyoto all of Japan--.

Signed and Sealed this

Thirteenth Day of October, 1992

Attest:

DOUGLAS B. COMER

*Attesting Officer*      Acting Commissioner of Patents and Trademarks